United States Patent [19]
Min

[11] Patent Number: 6,094,340
[45] Date of Patent: Jul. 25, 2000

[54] METHOD AND APPARATUS OF COUPLING LIQUID CRYSTAL PANEL FOR LIQUID CRYSTAL DISPLAY

[75] Inventor: Yoon-Ki Min, Suwon-si, Rep. of Korea

[73] Assignee: SamSung Electronics Co., Ltd., Suwon, Rep. of Korea

[21] Appl. No.: 09/083,995

[22] Filed: May 26, 1998

[30] Foreign Application Priority Data

May 27, 1997 [KR] Rep. of Korea ...................... 97-20942

[51] Int. Cl.⁷ ........................... H05K 5/00; G02F 1/1333
[52] U.S. Cl. ........................ 361/681; 361/682; 345/905; 248/917
[58] Field of Search ..................................... 361/683, 682, 361/681; 345/905; 248/917; 40/530

[56] References Cited

U.S. PATENT DOCUMENTS

| | | | |
|---|---|---|---|
| 4,772,100 | 9/1988 | Suenaga | 350/336 |
| 5,002,368 | 3/1991 | Anglin | 350/334 |
| 5,146,354 | 9/1992 | Plesinger | 359/49 |
| 5,193,069 | 3/1993 | Furuya | 364/708 |
| 5,196,993 | 3/1993 | Herron et al. | 361/393 |
| 5,264,992 | 11/1993 | Hogdahl et al. | 367/681 |
| 5,268,816 | 12/1993 | Abell, Jr. et al. | 361/729 |
| 5,272,601 | 12/1993 | McKillip | 362/27 |
| 5,274,486 | 12/1993 | Yamazaki et al. | |
| 5,335,100 | 8/1994 | Obata | 359/49 |
| 5,363,227 | 11/1994 | Ichikawa et al. | 359/83 |
| 5,400,160 | 3/1995 | Takahashi et al. | |
| 5,406,399 | 4/1995 | Koike | |
| 5,422,751 | 6/1995 | Lewis et al. | 359/83 |
| 5,467,102 | 11/1995 | Kuno et al. | 345/1 |
| 5,479,285 | 12/1995 | Burke | 359/83 |
| 5,486,942 | 1/1996 | Ichikawa et al. | 359/83 |
| 5,631,805 | 5/1997 | Bonsall | 361/681 |
| 5,640,296 | 6/1997 | Bonsall et al. | 361/681 |
| 5,669,020 | 9/1997 | Hopmeyer | |
| 5,687,939 | 11/1997 | Moscovitch | 248/122.1 |
| 5,729,250 | 3/1998 | Bishop et al. | 345/175 |
| 5,732,712 | 3/1998 | Adair | |
| 5,850,333 | 12/1998 | Owanesian et al. | 361/704 |

*Primary Examiner*—Leo P. Picard
*Assistant Examiner*—Anatoly Vortman
*Attorney, Agent, or Firm*—Robert E. Bushnell, Esq.

[57] ABSTRACT

A video display housing system adaptable for a plurality of differently sized video displays, the system comprising a first video display having a first side conveying varying visual information to a user, and having a second side; a first cover defining a first aperture and being disposed at the first side of the first video display, the first aperture corresponding in size to the first video display; a second video display having a first side conveying the varying visual information to the user, and having a second side, the second video display being differently sized than the first video display; a second cover defining a second aperture and being disposed at the first side of the second video display, the second aperture corresponding in size to the second video display; and a base unit being coupled to one among the first cover and the second cover, thereby forming an outer housing enclosing the first video display and the second video display respectively, the base unit being disposed at the second side of the first video display when coupled to the first cover, and the base unit being disposed at the second side of the second video display when coupled to the second cover. The first and second video displays can be video displays selected from a group consisting of liquid crystal displays, field emission displays, cathode ray tubes, gas-plasma displays, light emitting diode displays, electro-luminescent displays, and others.

18 Claims, 9 Drawing Sheets

METHOD AND APPARATUS OF COUPLING LIQUID CRYSTAL PANEL FOR LIQUID CRYSTAL DISPLAY

CLAIM OF PRIORITY

This application makes reference to, incorporates the same herein, and claims all benefits accruing under 35 U.S.C. § 119 from an application entitled METHOD AND APPARATUS OF COUPLING LIQUID CRYSTAL PANEL FOR LIQUID CRYSTAL DISPLAY earlier filed in the Korean Industrial Property Office on May 27, 1997, and there duly assigned Ser. No. 97-20942, a copy of which is annexed hereto.

BACKGROUND OF THE INVENTION

1. Technical Field

The present invention relates to a video display conveying varying visual information to a user, and more particularly to a video display housing system adaptable for a plurality of differently sized video displays.

2. Related Art

A video display conveys varying visual information to a user. One example of a video display is a cathode ray tube. When the cathode ray tube is properly connected to a host computer, the cathode ray tube can convey varying visual information to a user. Typically, a cathode ray tube will be contained in a housing. The housing will usually include a printed circuit board and also various connectors.

The host computer will transmit video signals to the cathode ray tube through a cable connected between the host computer and the cathode ray tube. The cable is usually not directly attached to the cathode ray tube. Rather, the cable is attached to a connector on the exterior of the housing which contains the cathode ray tube. The video signals are transmitted from the host computer to the printed circuit board mounted within the housing. Then the video signals are processed by the printed circuit board. After that, the processed video signals are transmitted from the printed circuit board to the cathode ray tube. Then the cathode ray tube conveys information corresponding to the video signals to the user.

There are several different types of video displays including, but not limited to, the cathode ray tube already mentioned above, a liquid crystal display, a field emission display, a gas-plasma display, a light emitting diode display, and an electro-luminescent display. Each of the video displays typically requires a housing.

The liquid crystal display, included in the list of video displays shown above, typically comprises a liquid crystal display panel on which an image is represented by means of an externally input video signal. The liquid crystal display panel is usually contained within a housing. The housing is usually connected to and supported by a stand. Housing apparatuses which house liquid crystal display panels and also stand devices which support those housing apparatuses are described in U.S. Ser. No. 08/965,642 and U.S. Ser. No. 08/965,644, here incorporated by reference.

Liquid crystal display panels are available in a variety of different sizes. I have found that a first liquid crystal display panel of a particular size and a second liquid crystal display panel of a different size will conventionally require two completely different housings, due to the difference in the size of the two liquid crystal display panels. In other words, the first liquid crystal display panel will require a first front case of a first size and a first rear case of a first size, forming the housing of the first liquid crystal display panel. The second liquid crystal display panel will require a second front case of a second size and a second rear case of a second size, forming the housing of the second liquid crystal display panel.

This is true for housings of other types of video displays also. In other words, a first video display of a particular size and a second video display of a different size will conventionally require two completely different housings, due to the difference in the size of the two video displays, as explained in detail pertaining to an example of two liquid crystal display panel housings. It can be expensive to design, manufacture, test, procure, and inventory a variety of differently sized housings for differently sized video displays.

Examples of housing methods and examples of housing devices are disclosed by U.S. Pat. No. 5,732,712 for *Sterile Encapsulated Operating Room Video Monitor And Video Monitor Support Device* issued to Adair, U.S. Pat. No. 5,669,020 for *Underwater Camera Housing Having Interchangeable Back Members to Accept Still and Video Cameras* issued to Hopmeyer; U.S. Pat. No. 5,422,751 for *Liquid Crystal Display Assembly Employing Front Bezel, Frame Holding Liquid Crystal Cell Attached To Bezel, and Light Source And Back Plate Attached To Bezel* issued to Lewis et al.; U.S. Pat. No. 5,406,399 for *Liquid Crystal Display Apparatus Having A Frame Around Periphery And Bottom And Extending Above Both Polarizers* issued to Koike; U.S. Pat. No. 5,400,160 for *Display Means For Apparatus With Transparent Panel Fixed To LCD Panel Via Elastic Packing With Ridges In ZigZag Pattern* issued to Takahashi et al.; U.S. Pat. No. 5,363,227 for *Liquid Crystal Display Mounting Structure* issued to Ichikawa et al.; and U.S. Pat. No. 5,274,486 for *Device For Holding Liquid Crystal Display Panel* issued to Yamazaki et al.

There can be high costs associated with the design, manufacture, testing, procuring, and inventorying of a variety of differently sized housings corresponding to differently sized video displays. Thus, although presently there do exist housing methods and housing devices, I discovered that it would be desirable to develop an improved and enhanced housing system for video displays.

SUMMARY OF THE INVENTION

Therefore, in order to overcome such problems of the related art, an object of the present invention is to provide a liquid crystal display panel coupling method and apparatus for a liquid crystal display, which allows all components except its front case to be commonly used in employing differently sized liquid crystal display panels.

Another object of the present invention is to provide a video display housing system adaptable for a plurality of differently sized video displays, allowing many components of the video display housing system to be able to be utilized by differently sized video displays. In this manner, cost-effective products can be produced helping to lower manufacturing costs.

These objects and other objects of the present invention can be achieved by a video display housing system adaptable for a plurality of differently sized video displays, the system comprising: a first video display having a first side conveying varying visual information to a user, and having a second side; a first cover defining a first aperture and being disposed at said first side of said first video display, said first aperture corresponding in size to said first video display; a second video display having a first side conveying the varying visual information to the user, and having a second side, said second video display being differently sized than said first video display; a second cover defining a second aperture and being disposed at said first side of said second video display, said second aperture corresponding in size to said second video display; and a base unit being coupled to one among said first cover and said second cover, thereby forming an outer housing enclosing said first video display and said second video display respectively, said base unit being disposed at said second side of said first video display when coupled to said first cover, and said base unit being disposed at said second side of said second video display when coupled to said second cover.

These objects and other objects of the present invention can be achieved by a video display housing system adaptable for a plurality of differently sized liquid crystal display panels, the system comprising: a first liquid crystal display panel having a first side conveying varying visual information to a user, and having a second side, and receiving electrical power; a first frame defining a first aperture and being disposed at said first side of said first video display, said first aperture corresponding in size to said first liquid crystal display panel; a second liquid crystal display panel having a first side conveying the varying visual information to the user, and having a second side, and receiving electrical power, said second liquid crystal display panel being differently sized than said first liquid crystal display panel; a second frame defining a second aperture and being disposed at said first side of said second liquid crystal display panel, said second aperture corresponding in size to said second liquid crystal display panel; and a base unit being coupled to one among said first frame and said second frame, thereby forming an outer housing enclosing said first liquid crystal display panel and said second liquid crystal display panel respectively, said base unit being disposed at said second side of said first liquid crystal display panel when coupled to said first frame, and said base unit being disposed at said second side of said second liquid crystal display panel when coupled to said second frame.

These objects and other objects of the present invention can be achieved by a method of housing a plurality of differently sized video displays, comprising the steps of: when housing a first video display, said first video display having a first side conveying varying visual information to a user and said first video display having a second side, first mounting said first video display to a base unit and then mounting a first cover to said base unit, said base unit and said first cover forming an outer housing enclosing said first video display; and when housing a second video display, said second video display having a first side conveying the varying visual information to the user and said second video display having a second side, said second video display being differently sized from said first video display, first mounting said second video display to a second cover and then mounting said second cover to said base unit, said base unit and said second cover forming an outer housing enclosing said second video display.

These objects and other objects of the present invention can be achieved by a video display housing system adaptable for a plurality of differently sized video displays, the system comprising: a first video display having a front conveying varying visual information to a user, and having a back; a first cover defining a first aperture and being disposed at said front of said first video display, said first aperture corresponding in size to said first video display; a second video display having a front conveying the varying visual information to the user, and having a back, said second video display being differently sized than said first video display; a second cover defining a second aperture and being disposed at said front of said second video display, said second aperture corresponding in size to said second video display; a base unit being coupled to one among said first cover and said second cover, thereby forming an outer housing enclosing said first video display and said second video display respectively, said base unit being disposed at said back of said first video display when coupled to said first cover, and said base unit being disposed at said back of said second video display when coupled to said second cover; a cable conveying a video signal to said base unit, the video signal corresponding to the varying visual information; a printed circuit board mounted to said base unit processing the video signal received from said cable, said printed circuit board receiving electrical power; a host computer connected to said cable and transmitting the video signal to said base unit through said cable; a display stand unit connected to said base unit and supporting said base unit; and a hinge unit rotatably connecting said display stand unit to said base unit.

The liquid crystal display includes a first set of a predetermined size of first liquid crystal display panel and a first front case having a screen space suitable for the size of the first liquid crystal display panel; a second set of a second liquid crystal display panel of a different size than the first and a second front case having a screen space suitable for the size of the second liquid crystal display panel, whereby the first or second set is selectively coupled to a rear case.

The present invention is more specifically described in the following paragraphs by reference to the drawings attached only by way of example.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
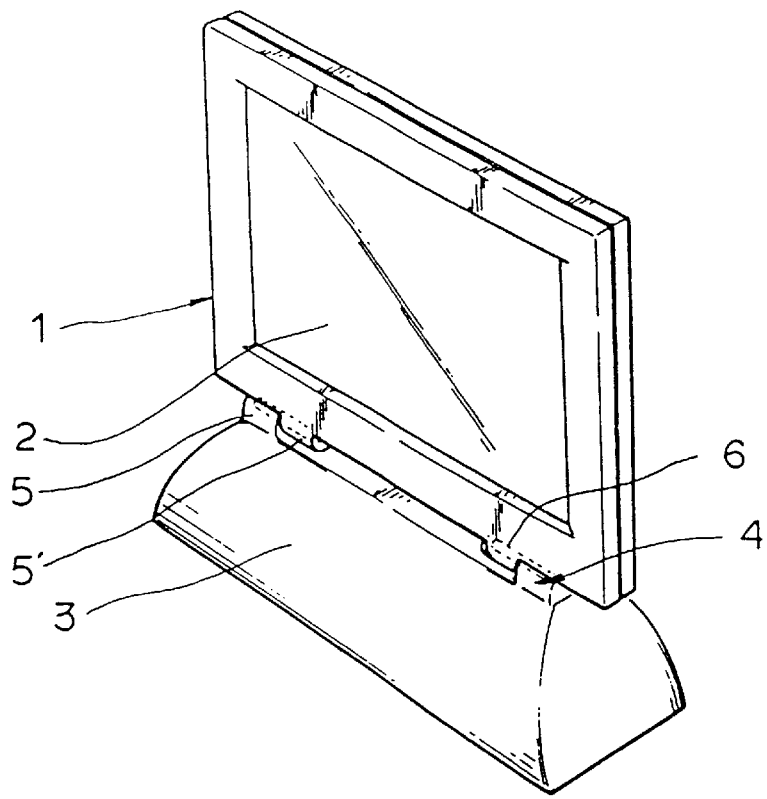
FIG. 1 is a top front perspective view of a liquid crystal display panel in a conventional housing.
Figure 2:
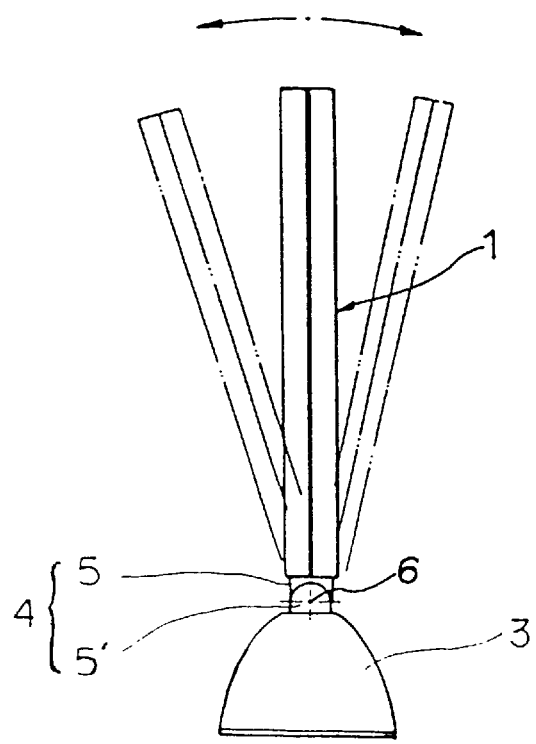
FIG. 2 is a side view of the liquid crystal display panel in the conventional housing of FIG. 1, alternate positions thereof shown in broken lines.

Refer now to FIG. 1, which is a top front perspective view of a liquid crystal display panel in a conventional housing, and also to FIG. 2, which is a side view of the liquid crystal display panel in the conventional housing of FIG. 1, alternate positions thereof shown in broken lines. FIGS. 1 and 2 illustrate a conventional housing 1 which houses a liquid crystal display panel 2, where the liquid crystal display panel 2 conveys varying visual information to a user. There is a stand unit 3 supporting the housing 1 and a hinge mechanism 4. The hinge mechanism 4 connects the housing 1 to the stand unit 3 and also enables the user to control the viewing direction of the liquid crystal display panel 2. The hinge mechanism 4 includes hinge pieces 5 and 5' which are combined with the housing 1 and the stand unit 3, respectively. There is a horizontal hinge shaft 6 linking the aforementioned hinge pieces 5 and 5'. Thus, the housing 1, being supported by the stand unit 3, can pivot on the hinge mechanism 4.

Figure 3:
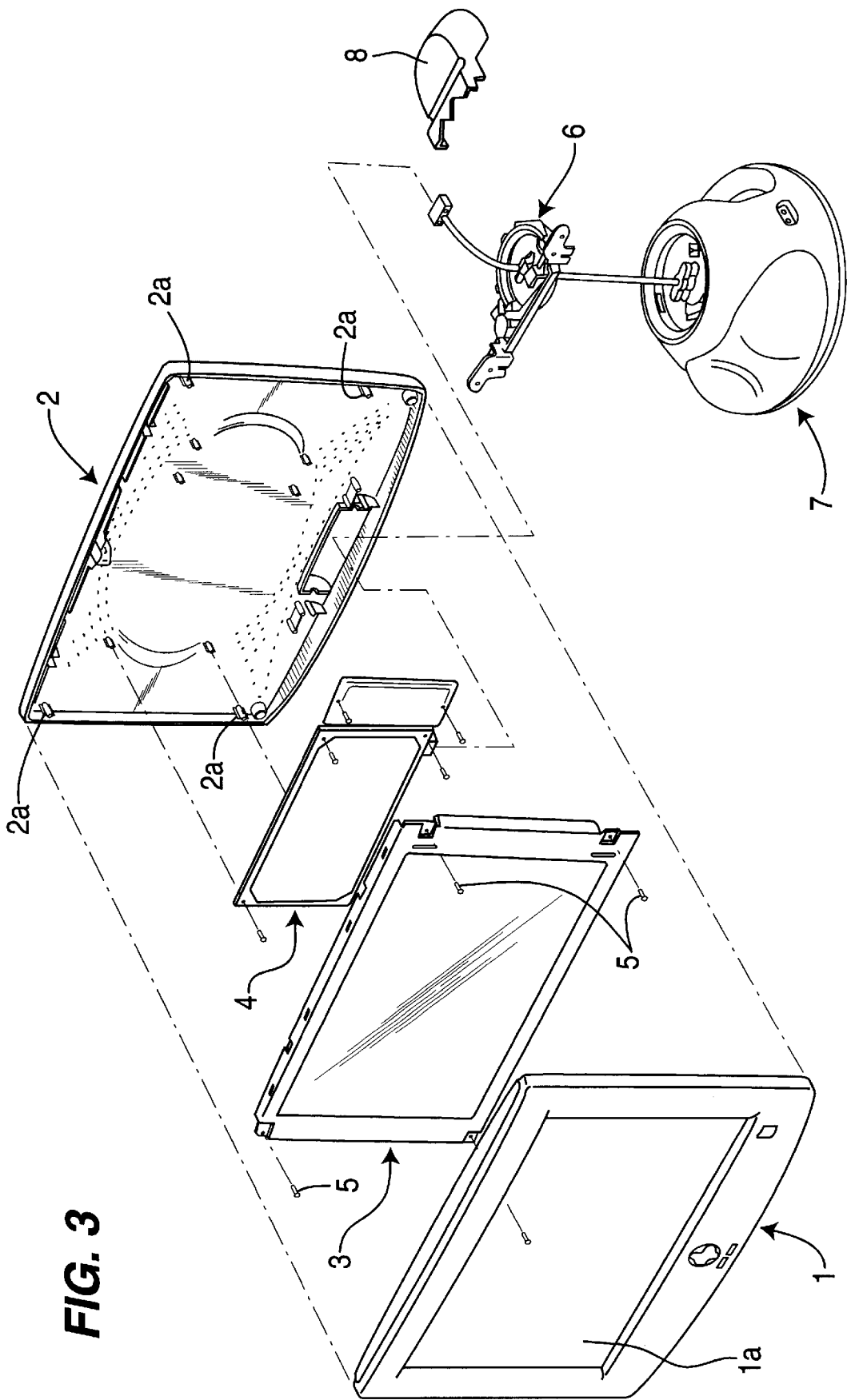
FIG. 3 is an exploded perspective of a liquid crystal display panel in a conventional housing.
Figure 4:
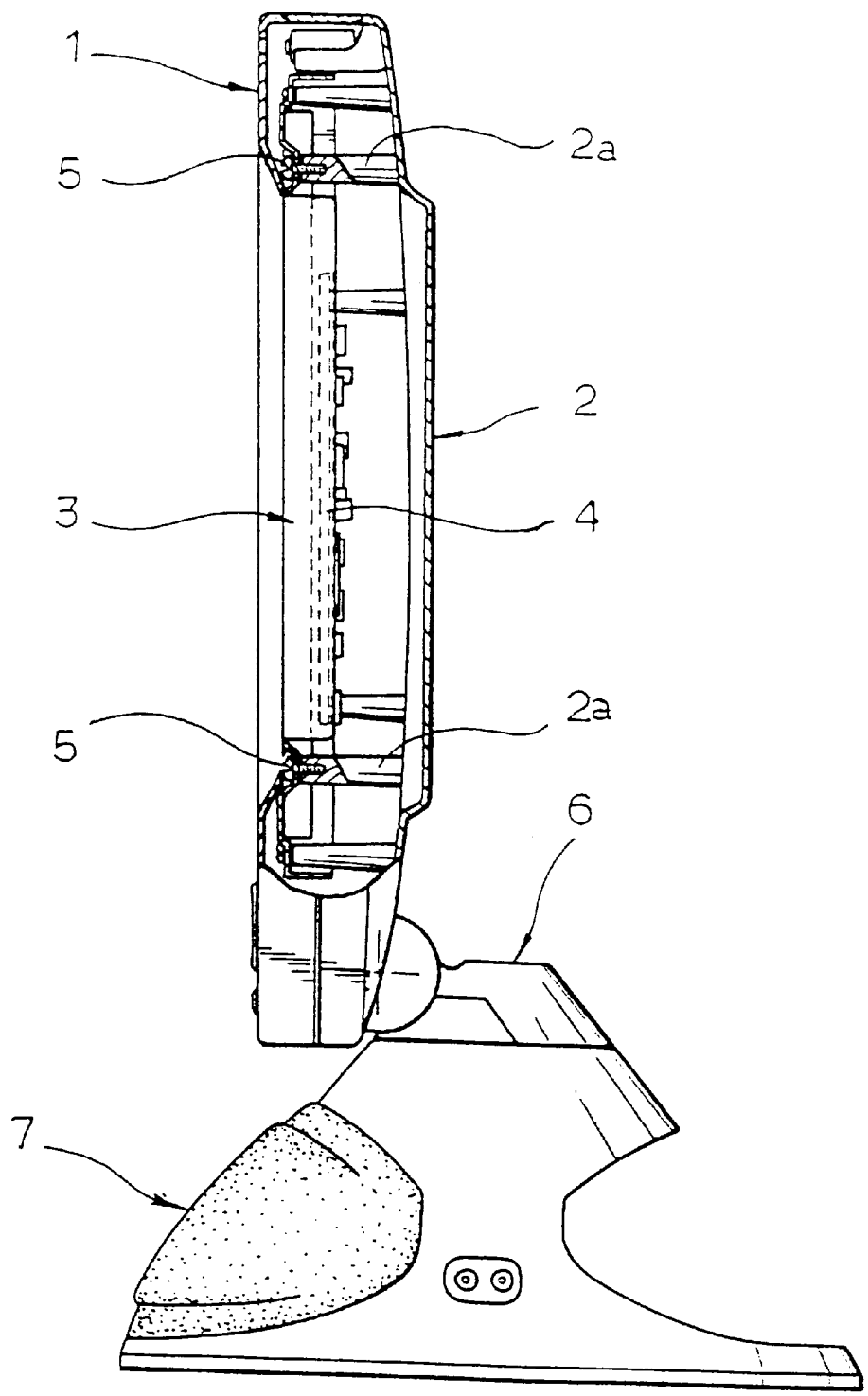
FIG. 4 is a side section of the liquid crystal display panel in the conventional housing of FIG. 3.

Refer now to FIG. 3, which is an exploded perspective of a liquid crystal display panel in a conventional housing, and also to FIG. 4, which is a side section of the liquid crystal display panel in the conventional housing of FIG. 3. As shown, liquid crystal display panel 3 is coupled between front case 1 and rear case 2. The conventional housing is comprised of the front case 1 and the rear case 2. Liquid crystal display panel 3 is first fastened with screws 5 onto rear case 2 where circuit board 4 is fixed, and then front case 1 having screen space 1 a is fitted into the front surface of rear case 2. Prior to this assembly, hinge 6 is joined to the bottom of rear case 2. Finally, stand 7 is fixed to hinge 6, and then hinge cover 8 is fitted. The screws 5 are screwed into the bosses 2a on the rear case 2, thereby mounting the liquid crystal display panel 3 to the rear case 2. In other words, the screws 5 are screwed into the threaded screw receiving holes 2a.

In FIGS. 3 and 4, the front and rear cases 1 and 2 are designed and manufactured to be coupled in accordance with the size of liquid crystal display panel 3. As a result, the size of liquid crystal display panel 3 absolutely affects the whole size of the conventional housing, and determines the position of bosses 2a for fixing the liquid crystal display panel 3.

When the size of the liquid crystal display panel 3 are determined, bosses 2a for securing liquid crystal display panel 3 are formed on rear case 2, where the liquid crystal display panel 3 is mounted. On the front surface of rear case 2 where liquid crystal display panel 3 is mounted, front case 1 is fixedly fitted with a hook and screws. However, in order to install a differently sized liquid crystal display panel on the rear case 2, the fastening position of screws must change, causing various problems in their fitting.

Figure 5:
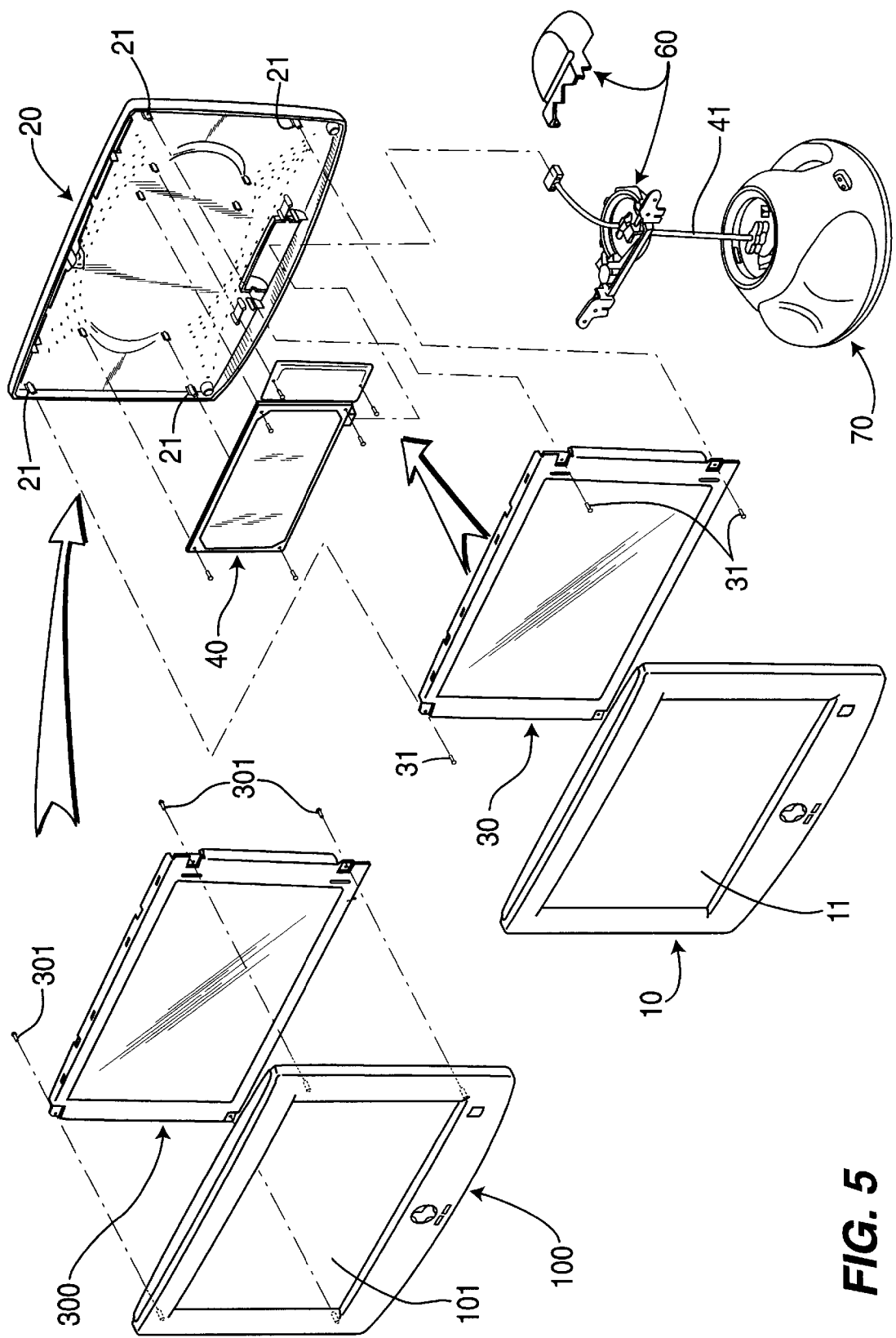
FIG. 5 is an exploded perspective of a first liquid crystal display panel, a second liquid crystal display panel, and a video display housing system, according to the principles of the present invention.

Hereinafter, preferred embodiments of the present invention will be described in detail with reference to the attached drawings. Refer now to FIG. 5, which is an exploded perspective of a first liquid crystal display panel, a second liquid crystal display panel, and a video display housing system, according to the principles of the present invention. There is shown a first liquid crystal display panel 30 on which an image is displayed by means of an externally input video signal. A housing of the liquid crystal display panel 30 includes a first front case 10 conforming to the size of first liquid crystal display panel 30, and a first rear case 20 fitting with the first front case 10 and the first liquid crystal display panel 30.

The first rear case 20 is formed to protrudently have there inside fixing bosses 21 for allowing first liquid crystal display panel 30 to be fastened with screws 31, in four locations. At the bottom of first rear case 20, hinge 60 for rotatably controlling the angle of the liquid crystal display panel 30 forward and backward and left and right is coupled. Stand 70 is connected to the bottom of hinge 60.

A circuit board 40 is fixed onto the inner surface of first rear case 20, and a cable 41 that links to stand 70 is connected to circuit board 40. First front case 10 having screen space 11 is fitted with the front of first rear case 20.

In addition to the first liquid crystal display panel 30 and first front case 10, the present invention further consists of differently sized second liquid crystal display panel 300 and second front case 100. For example, suppose that the first liquid crystal display panel 30 is 14 inches in size, and the second liquid crystal display panel 300 is 13.3 inches in size. Thus, the second liquid crystal display panel 300 is slightly smaller than the first liquid crystal display panel 30. Therefore, the fastening positions of the second panel 300 with screws 301 are different from the fastening positions of the first panel 30.

The exterior size of second front case 100 is formed to fit with first rear case 20. The screen space 101 of second front case 100 is made suitable for second liquid crystal display panel 300. On the inner surface of second front case 100, bosses 102 for allowing second liquid crystal display panel 300 to be fixed with screws 301 are protrudently formed in four locations.

Figure 6A:
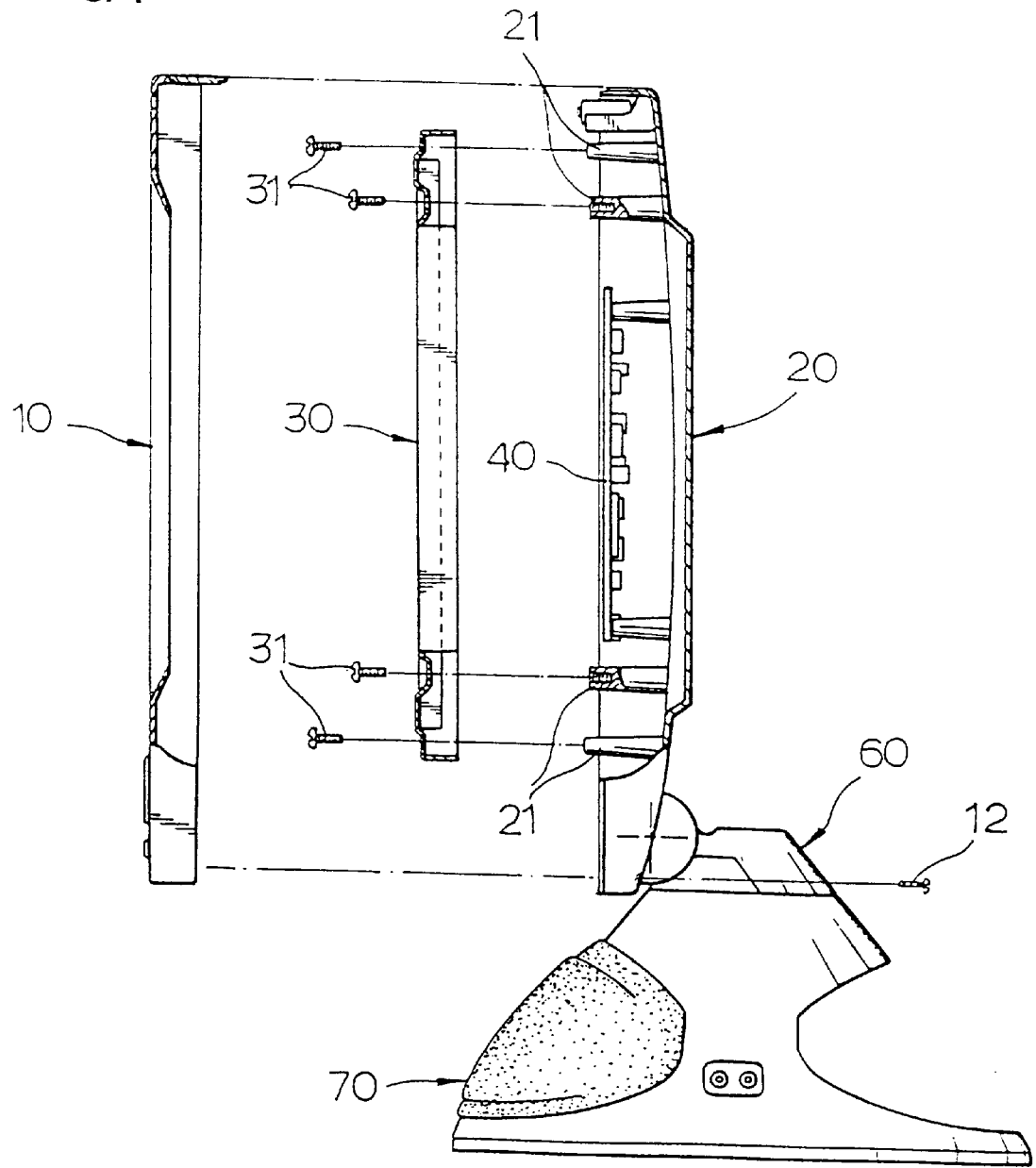
FIG. 6A is an exploded side view of components a first embodiment of the video display housing system of FIG. 5, according to the principles of the present invention.
Figure 6B:
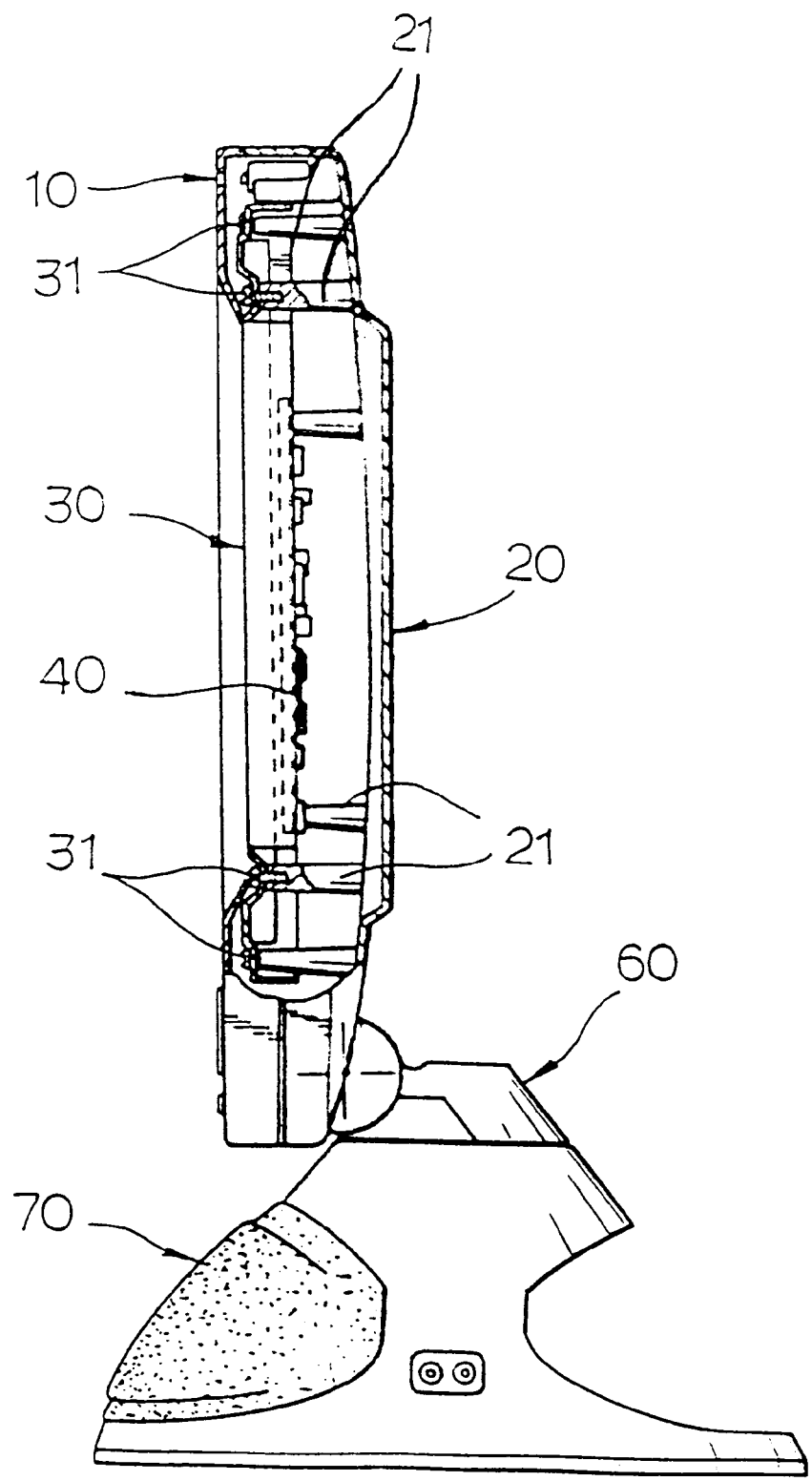
FIG. 6B is an assembled section of the first embodiment of the video display housing system of FIG. 6A, according to the principles of the present invention.

Turn now to FIG. 6A, which is an exploded side view of components a first embodiment of the video display housing system of FIG. 5, according to the principles of the present invention. Also refer to FIG. 6B, which is an assembled section of the first embodiment of the video display housing system of FIG. 6A, according to the principles of the present invention. The first coupling embodiment of the present invention is carried out in such a manner that circuit board 40 is first installed on first rear case 20, and then first liquid crystal display panel 30 is fixed to bosses 21 of first rear case 20 with screws 31. After this procedure, first front case 10 is fitted into first rear case 20 where first liquid crystal display panel 30 is installed, using screws 12 and snap hook (not shown) as coupling means. Refer now to FIG. 6A. As shown in FIG. 6A, a base unit can be understood to correspond to the first rear case 20. Thus, the base unit can fit together with the first front case 10 to enclose the first LCD panel 30. Furthermore, such a base unit can fit together with the second front case 100 to enclose the second LCD panel 300. With continued reference to FIG. 6A, note that a second embodiment of abase unit could correspond to a combination of the stand 70 with the hinge 60 and the first rear case 20. Also, in a third embodiment, the stand 70 could be considered as a base unit.

Figure 7A:
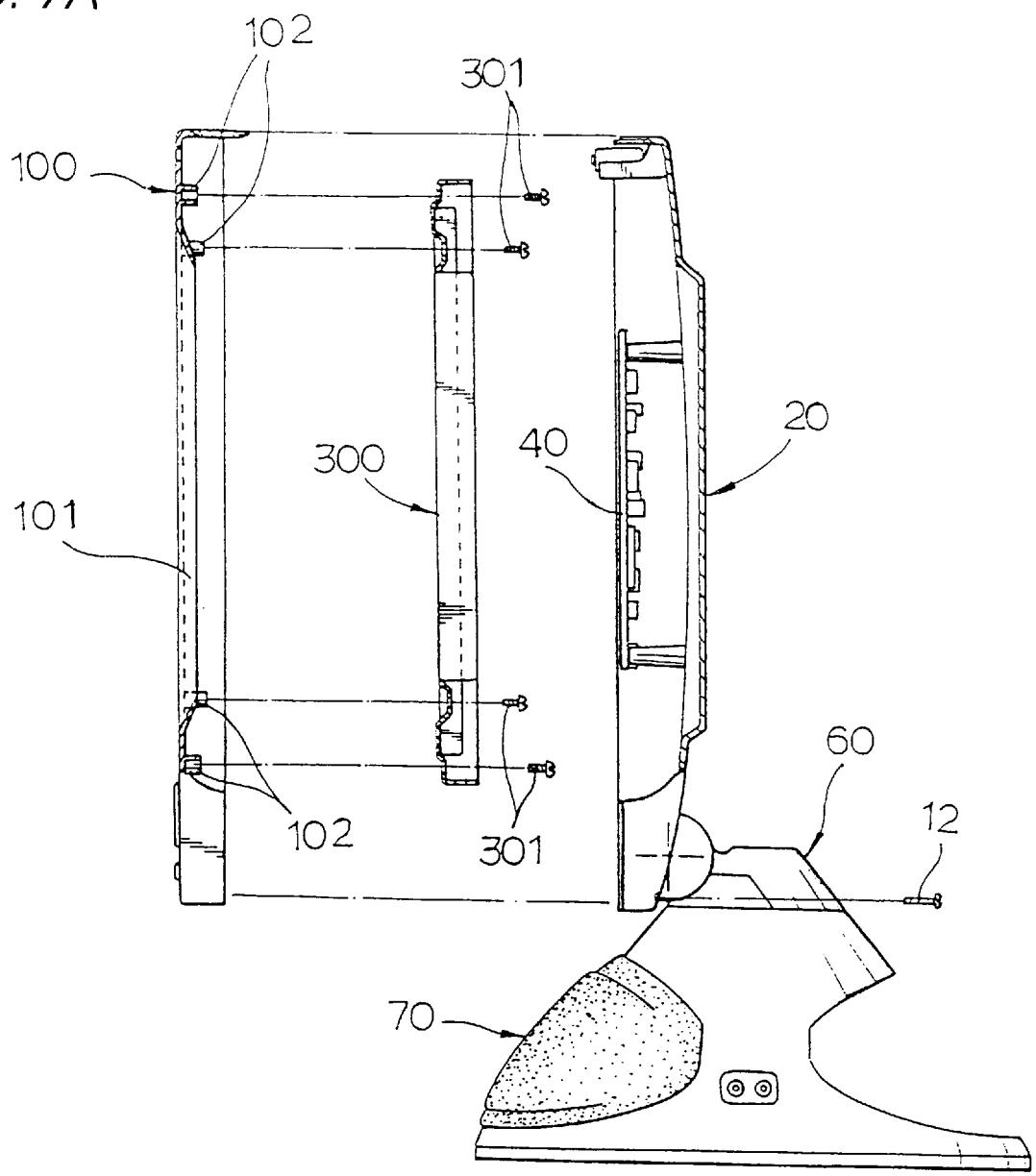
FIG. 7A is an exploded side view of components a second embodiment of the video display housing system of FIG. 5, according to the principles of the present invention.

Turn now to FIG. 7A, which is an exploded side view of components a second embodiment of the video display housing system of FIG. 5, according to the principles of the present invention. Also refer to FIG. 7B, which is an assembled section of the second embodiment of the video display housing system of FIG. 7A, according to the principles of the present invention. There is shown the second coupling embodiment of the present invention. According to this method, second liquid crystal display panel 300 is secured to second front case 100 via bosses 102 with screws 301, and then second front case 100 having second liquid crystal display panel 300 is fitted into first rear case 20.

When the differently sized first and second liquid crystal display panels 30 and 300 are coupled, problems with the sizing of the first and second front cases 10 and 100 can be avoided, due to the present invention. In this situation, the first and second front cases 10 and 100 may be made and fitted with the first rear case 20, even though the size of liquid crystal display panels to be housed is varied. In other words, in employing differently sized first and second liquid crystal display panels 30 and 300, the relatively large first panel 30 is installed directly onto first rear case 20. Conversely, the relatively small second panel 300 is installed directly onto the separately made second front case 100, and then the second front case 100 is installed directly onto the first rear case 20. Therefore, components including first rear case 20, hinge 60, and stand 70, can be commonly used. In other words, costs can be lowered since several components of the video display housing system of the present invention can be used with differently sized video displays.

Figure 7B:
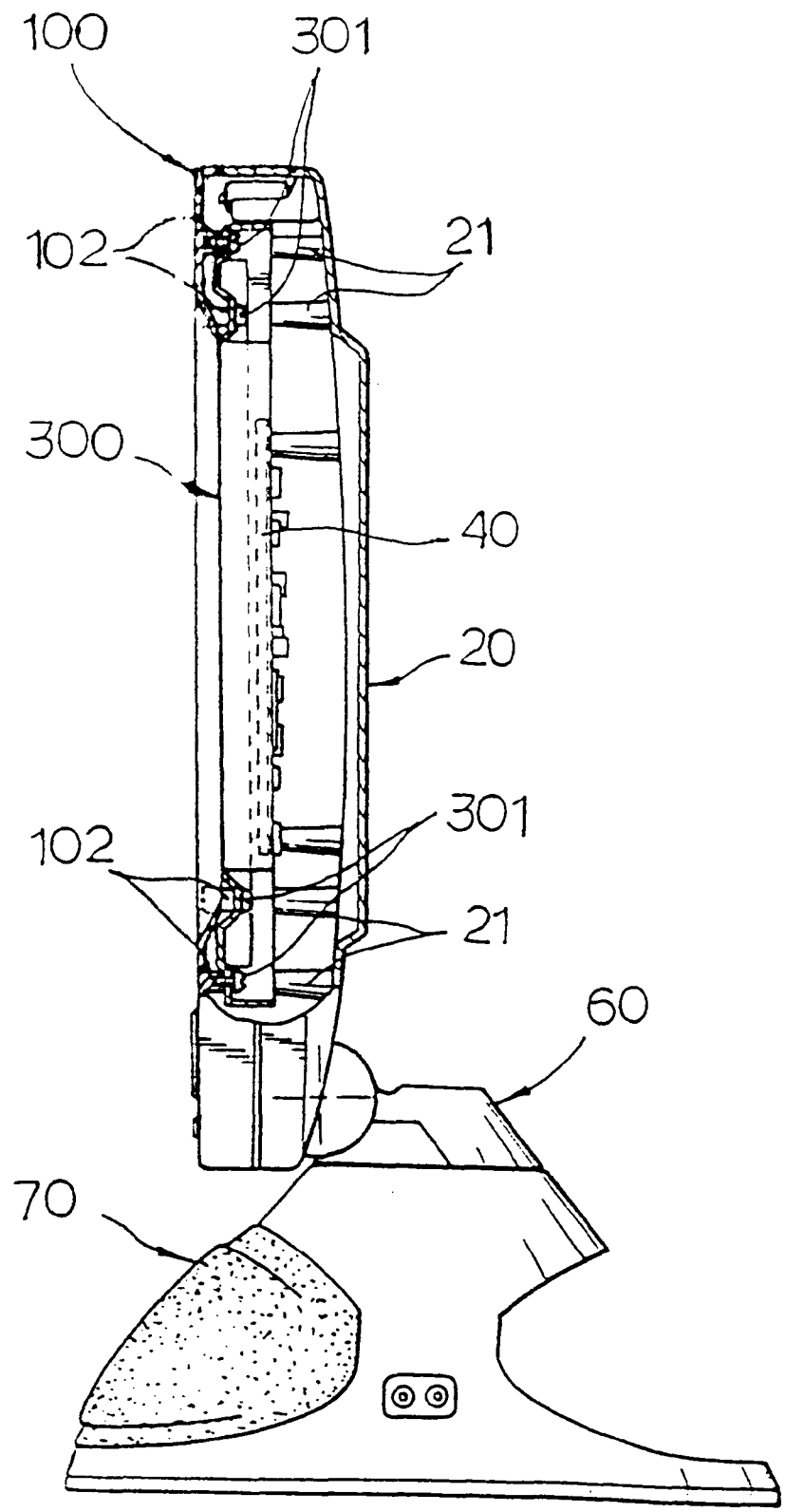
FIG. 7B is an assembled section of the second embodiment of the video display housing system of FIG. 7A, according to the principles of the present invention.
Figure 8A:
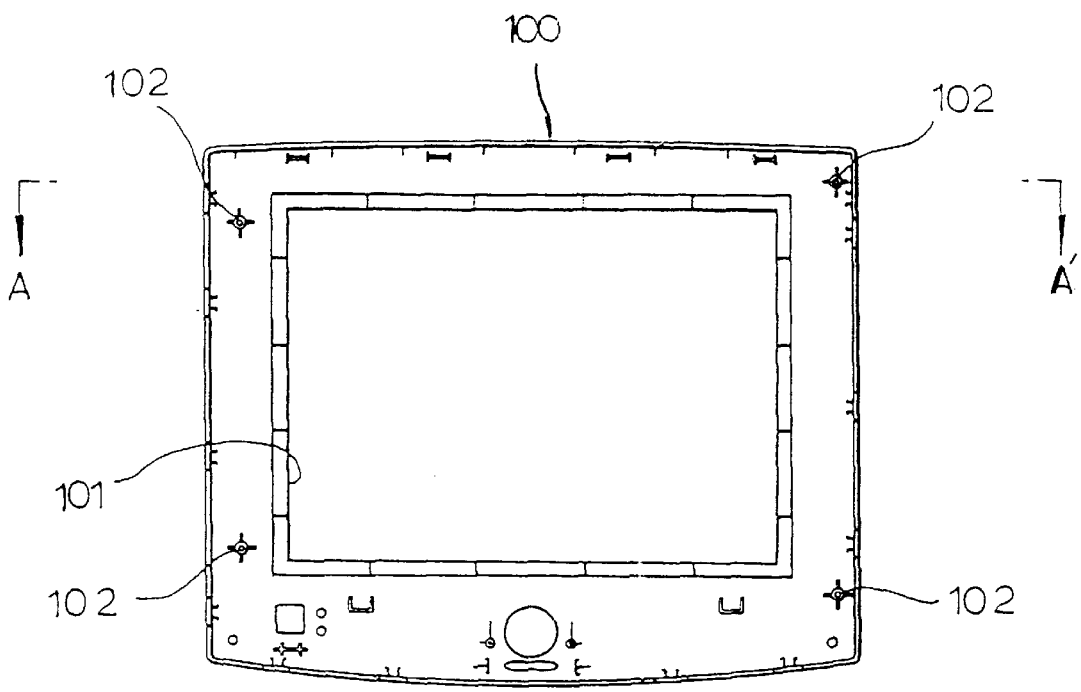
FIG. 8A is a view of a front case used in the second embodiment of the video display housing system of FIGS. 7A and 7B, according to the principles of the present invention.
Figure 8B:
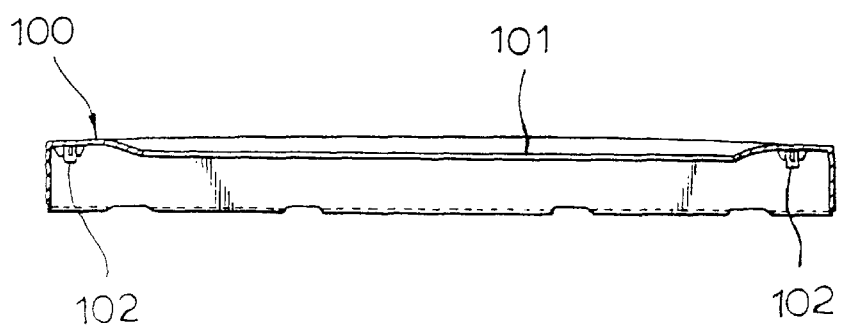
FIG. 8B is a section of line A—A' of FIG. 8A, according to the principles of the present invention.

Turn now to FIG. 8A, which is a view of a front case used in the second embodiment of the video display housing system of FIGS. 7A and 7B, according to the principles of the present invention. Also refer to FIG. 8B, which is a section of line A—A' of FIG. 8A, according to the principles of the present invention. In FIGS. 8A and 8B, there are shown the bosses 102, the second front case 100, and the screen space 101.

As described above, the present invention allows all components except the liquid crystal display panel itself and a front case to be commonly used in housing differently sized liquid crystal display panels, thereby enabling cost reduction. Accordingly, this can decrease product price and enhance competitiveness.

The foregoing paragraphs describe the details of a liquid crystal display with a liquid crystal display panel on which an image is exhibited by means of an external video signal and more particularly, a liquid crystal display panel coupling method and apparatus in which all components except the liquid crystal display panel itself and a front case can be commonly employed in housing differently sized liquid crystal display panels. The present invention can also be utilized to house video displays other than a liquid crystal display panel. For example, the present invention can be utilized to house one among a cathode ray tube, a field emission display, a gas-plasma display, a light emitting diode display, and an electro-luminescent display.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A video display housing system adaptable for a plurality of differently sized video displays, the comprising:
   a first video display having a first side conveying varying visual information to a user, and having a second side;
   a first cover defining a first aperture and being disposed at said first side of said first video display, said first aperture corresponding in size to said first video display;
   a second video display having a first side conveying the varying visual information to the user, and having a second side, said second video display being differently sized than said first video display surface area of said first side of said first video display exceeding surface area of said first side of said second video display;
   a second cover defining a second aperture and being disposed at said first side of said second video display, said second aperture corresponding in size to said second video display; and
   a base unit being coupled to one among said first cover and said second cover, thereby forming an outer housing enclosing said first video display and said second video display respectively, said base unit being disposed at said second side of said first video display when coupled to said first cover, and said base unit being disposed at said second side of said second video display when coupled to said second cover.

2. The system of claim 1, further comprising:
   a first attachment unit of said first video display;
   a second attachment unit of said first cover;
   a third attachment unit of said second video display;
   a fourth attachment unit of said second cover in cooperation with said third attachment unit enabling coupling of said second video display to said second cover;
   a fifth attachment unit of said second cover; and
   a sixth attachment unit of said base unit in cooperation with said first and second attachment units enabling coupling of said base unit to said first video display and to said first cover when said base unit and said first cover form the outer housing enclosing said first video display, and said sixth attachment unit in cooperation with said fifth attachment unit enabling coupling of said base unit to said second cover when said base unit and said second cover form the outer housing enclosing said second video display.

3. The system of claim 2, said sixth attachment unit further comprising:
   a first mounting unit in cooperation with said first attachment unit enabling coupling of said base unit to said first video display when said base unit and said first cover form the outer housing enclosing said first video display; and
   a second mounting unit in cooperation with said second attachment unit enabling coupling of said base unit to said first cover when said base unit and said first cover form the outer housing enclosing said first video display, and said second mounting unit in cooperation with said fifth attachment unit enabling coupling of said base unit to said second cover when said base unit and said second cover form the outer housing enclosing said second video display.

4. The system of claim 1, when said base unit is coupled to said first cover thereby forming the outer housing enclosing said first video display, further comprising:
   said first video display defining a first plurality of apertures;

said first cover defining a first plurality of screw engaging orifices; and said base unit defining a second plurality of apertures and a second plurality of screw engaging orifices, the first plurality of apertures receiving a first plurality of screws and then the second plurality of screw engaging orifices receiving and engaging the first plurality of screws coupling said first video display to said base unit, the second plurality of apertures receiving a second plurality of screws and then the first plurality of screw engaging orifices receiving and engaging the second plurality of screws coupling said first cover to said base unit.

5. The system of claim 1, when said base unit is coupled to said second cover thereby forming the outer housing enclosing said second video display, further comprising:

said second video display defining a first plurality of apertures;

said second cover defining first and second pluralities of screw engaging orifices; and said base unit defining a second plurality of apertures, the first plurality of apertures receiving a first plurality of screws and then the first plurality of screw engaging orifices receiving and engaging the first plurality of screws coupling said second video display to said second cover, the second plurality of apertures receiving a second plurality of screws and then the second plurality of screw engaging orifices receiving and engaging the second plurality of screws coupling said base unit to said second cover.

6. The system of claim 1, further comprising:

when said base unit and said first cover form the outer housing enclosing said first video display, said first video display is first mounted to said base unit and then said first cover is fitted over said first video display and mounted to said base unit enclosing said first video display; and when said base unit and said second cover form the outer housing enclosing said second video display, said second video display is first mounted to said second cover and then said second cover is mounted to said base unit enclosing said second video display.

7. A video display housing system adaptable for a plurality of differently sized liquid crystal display panels, the system comprising:

a first liquid crystal display panel having a first side conveying varying visual information to a user, and having a second side, and receiving electrical power;

a first frame defining a first aperture and being disposed at said first side of said first video display, said first aperture corresponding in size to said first liquid crystal display panel;

a second liquid crystal display panel having a first side conveying the varying visual information to the user, and having a second side, and receiving electrical power, said second liquid crystal display panel being differently sized than said first liquid crystal display panel, surface area of said first side of said first liquid crystal display panel exceeding surface area of said first side of said second liquid crystal display panel;

a second frame defining a second aperture and being disposed at said first side of said second liquid crystal display panel, said second aperture corresponding in size to said second liquid crystal display panel: and a base unit being coupled to one among said first frame and said second frame, thereby forming an outer housing enclosing said first liquid crystal display panel and said second liquid crystal display panel respectively, said base unit being disposed at said second side of said first liquid crystal display panel when coupled to said first frame, and said base unit being disposed at said second side of said second liquid crystal display panel when coupled to said second frame.

8. The system of claim 7, further comprising:

a first attachment unit of said first liquid crystal display panel;

a second attachment unit of said first frame;

a third attachment unit of said second liquid crystal display panel;

a fourth attachment unit of said second frame in cooperation with said third attachment unit enabling coupling of said second liquid crystal display panel to said second frame;

a fifth attachment unit of said second frame; and a sixth attachment unit of said base unit in cooperation with said first and second attachment units enabling coupling of said base unit to said first liquid crystal display panel and to said first frame when said base unit and said first frame form the outer housing enclosing said first liquid crystal display panel, and said sixth attachment unit in cooperation with said fifth attachment unit enabling coupling of said base unit to said second frame when said base unit and said second frame form the outer housing enclosing said second liquid crystal display panel.

9. The system of claim 8, said sixth attachment unit further comprising:

a first mounting unit in cooperation with said first attachment unit enabling coupling of said base unit to said first liquid crystal display panel when said base unit and said first frame form the outer housing enclosing said first liquid crystal display panel; and a second mounting unit in cooperation with said second attachment unit enabling coupling of said base unit to said first frame when said base unit and said first frame form the outer housing enclosing said first liquid crystal display panel, and said second mounting unit in cooperation with said fifth attachment unit enabling coupling of said base unit to said second frame when said base unit and said second frame form the outer housing enclosing said second liquid crystal display panel.

10. The system of claim 7, when said base unit is coupled to said first frame thereby forming the outer housing enclosing said first liquid crystal display panel, further comprising:

said first liquid crystal display panel defining a first plurality of apertures;

said first frame defining a first plurality of screw engaging orifices; and said base unit defining a second plurality of apertures and a second plurality of screw engaging orifices, the first plurality of apertures receiving a first plurality of screws and then the second plurality of screw engaging orifices receiving and engaging the first plurality of screws coupling said first liquid crystal display panel to said base unit, the second plurality of apertures receiving a second plurality of screws and then the first plurality of screw engaging orifices receiving and engaging the second plurality of screws coupling said first frame to said base unit.

11. The system of claim 7, when said base unit is coupled to said second frame thereby forming the outer housing enclosing said second liquid crystal display panel, further comprising:

said second liquid crystal display panel defining a first plurality of apertures;

said second frame defining first and second pluralities of screw engaging orifices; and said base unit defining a second plurality of apertures, the first plurality of apertures receiving a first plurality of screws and then the first plurality of screw engaging orifices receiving and engaging the first plurality of screws coupling said second liquid crystal display panel to said second frame, the second plurality of apertures receiving a second plurality of screws and then the second plurality of screw engaging orifices receiving and engaging the second plurality of screws coupling said base unit to said second frame.

12. The system of claim 7, further comprising:

when said base unit and said first frame form the outer housing enclosing said first liquid crystal display panel, said first liquid crystal display panel is first mounted to said base unit and then said first frame is fitted over said first liquid crystal display panel and mounted to said base unit enclosing said first liquid crystal display panel; and when said base unit and said second frame form the outer housing enclosing said second liquid crystal display panel, said second liquid crystal display panel is first mounted to said second frame and then said second frame is mounted to said base unit enclosing said second liquid crystal display panel.

13. A method of housing a plurality of differently sized video displays, comprising the steps of:

when housing a first video display, said first video display having a first side conveying varying visual information to a user and said first video display having a second side, first mounting said first video display to a base unit and then mounting a first cover to said base unit, said base unit and said first cover forming an outer housing enclosing said first video display; and when housing a second video display, said second video display having a first side conveying the varying visual information to the user and said second video display having a second side, said second video display being differently sized from said first video display, first mounting said second video display to a second cover and then mounting said second cover to said base unit, said base unit and said second cover forming an outer housing enclosing said second video display, surface area of said first side of said first video display exceeding surface area of said first side of said second video display.

14. A method of housing a plurality of differently sized video displays, comprising the steps of:

when housing a first video display, said first video display having a first side conveying varying visual information to a user and said first video display having a second side, first mounting said first video display to a base unit and then mounting a first cover to said base unit, said base unit and said first cover forming an outer housing enclosing said first video display; and when housing a second video display, said second video display having a first side conveying the varying visual information to the user and said second video display having a second side, said second video display being differently sized from said first video display, first mounting said second video display to a second cover and then mounting said second cover to said base unit, said base unit and said second cover forming an outer housing enclosing said second video display;

said first video display including a first attachment unit, said first cover including a second attachment unit, said second video display including a third attachment unit, said second cover including a fourth attachment unit, said fourth attachment unit in cooperation with said third attachment unit enabling said mounting of said second video display to said second cover, said second cover including a fifth attachment unit;

said base unit including a sixth attachment unit, said sixth attachment unit in cooperation with said first and second attachment units enabling said mounting of said base unit to said first video display and to said first cover when said base unit and said first cover form the outer housing enclosing said first video display, and said sixth attachment unit in cooperation with said fifth attachment unit enabling said mounting of said base unit to said second cover when said base unit and said second cover form the outer housing enclosing said second video display.

15. The method of claim 14, said sixth attachment unit further comprising:

a first mounting unit in cooperation with said first attachment unit enabling said mounting of said base unit to said first video display when said base unit and said first cover form the outer housing enclosing said first video display; and a second mounting unit in cooperation with said second attachment unit enabling said mounting of said base unit to said first cover when said base unit and said first cover form the outer housing enclosing said first video display, and said second mounting unit in cooperation with said fifth attachment unit enabling said mounting of said base unit to said second cover when said base unit and said second cover form the outer housing enclosing said second video display.

16. A method of housing a plurality of differently sized video displays, comprising the steps of:

when housing a first video display, said first video display having a first side conveying varying visual information to a user and said first video display having a second side, first mounting said first video display to a base unit and then mounting a first cover to said base unit, said base unit and said first cover forming an outer housing enclosing said first video display; and when housing a second video display, said second video display having a first side conveying the varying visual information to the user and said second video display having a second side, said second video display being differently sized from said first video display, first mounting said second video display to a second cover and then mounting said second cover to said base unit, said base unit and said second cover forming an outer housing enclosing said second video display;

when said base unit is mounted to said first cover thereby forming the outer housing enclosing said first video display, further comprising:

said first video display defining a first plurality of apertures;

said first cover defining a first plurality of screw engaging orifices; and said base unit defining a second plurality of apertures and a second plurality of screw engaging orifices, the first plurality of apertures receiving a first plurality of screws and then the second plurality of screw engaging orifices receiving and engaging the first plurality of screws coupling said first video display to said base unit, the second plurality of apertures receiving a second plurality of screws and then the first plurality of screw engaging orifices receiving and engaging the second plurality of screws coupling said first cover to said base unit.

17. A method of housing a plurality of differently sized video displays, comprising the steps of:

when housing a first video display, said first video display having a first side conveying varying visual information to a user and said first video display having a second side, first mounting said first video display to a base unit and then mounting a first cover to said base unit, said base unit and said first cover forming an outer housing enclosing said first video display; and when housing a second video display, said second video display having a first side conveying the varying visual information to the user and said second video display having a second side, said second video display being differently sized from said first video display, first mounting said second video display to a second cover and then mounting said second cover to said base unit, said base unit and said second cover forming an outer housing enclosing said second video display;

when said base unit is mounted to said second cover thereby forming the outer housing enclosing said second video display, further comprising:

said second video display defining a first plurality of apertures;

said second cover defining first and second pluralities of screw engaging orifices; and said base unit defining a second plurality of apertures, the first plurality of apertures receiving a first plurality of screws and then the first plurality of screw engaging orifices receiving and engaging the first plurality of screws coupling said second video display to said second cover, the second plurality of apertures receiving a second plurality of screws and then the second plurality of screw engaging orifices receiving and engaging the second plurality of screws coupling said base unit to said second cover.

18. A video display housing system adaptable for a plurality of differently sized video displays, the system comprising:

a first video display having a front conveying varying visual information to a user, and having a back;

a first cover defining a first aperture and being disposed at said front of said first video display, said first aperture corresponding in size to said first video display;

a second video display having a front conveying the varying visual information to the user, and having a back, said second video display being differently sized than said first video display;

a second cover defining a second aperture and being disposed at said front of said second video display, said second aperture corresponding in size to said second video display, said first and second covers being formed to have a same exterior size and the first and second apertures being formed to have different aperture sizes;

a base unit being coupled to one among said first cover and said second cover, thereby forming an outer housing enclosing said first video display and said second video display respectively, said base unit being disposed at said back of said first video display when coupled to said first cover, and said base unit being disposed at said back of said second video display when coupled to said second cover;

a cable conveying a video signal to said base unit, the video signal corresponding to the varying visual information;

a printed circuit board mounted to said base unit processing the video signal received from said cable, said printed circuit board receiving electrical power;

a host computer connected to said cable and transmitting the video signal to said base unit through said cable;

a display stand unit connected to said base unit and supporting said base unit; and a hinge unit rotatably connecting said display stand unit to said base unit.

\* \* \* \* \*